(No Model.)
E. N. DICKERSON & J. J. SUCKERT.
PROCESS OF AND APPARATUS FOR PRODUCING AND LIQUEFYING ACETYLENE GAS.
No. 535,944. Patented Mar. 19, 1895.
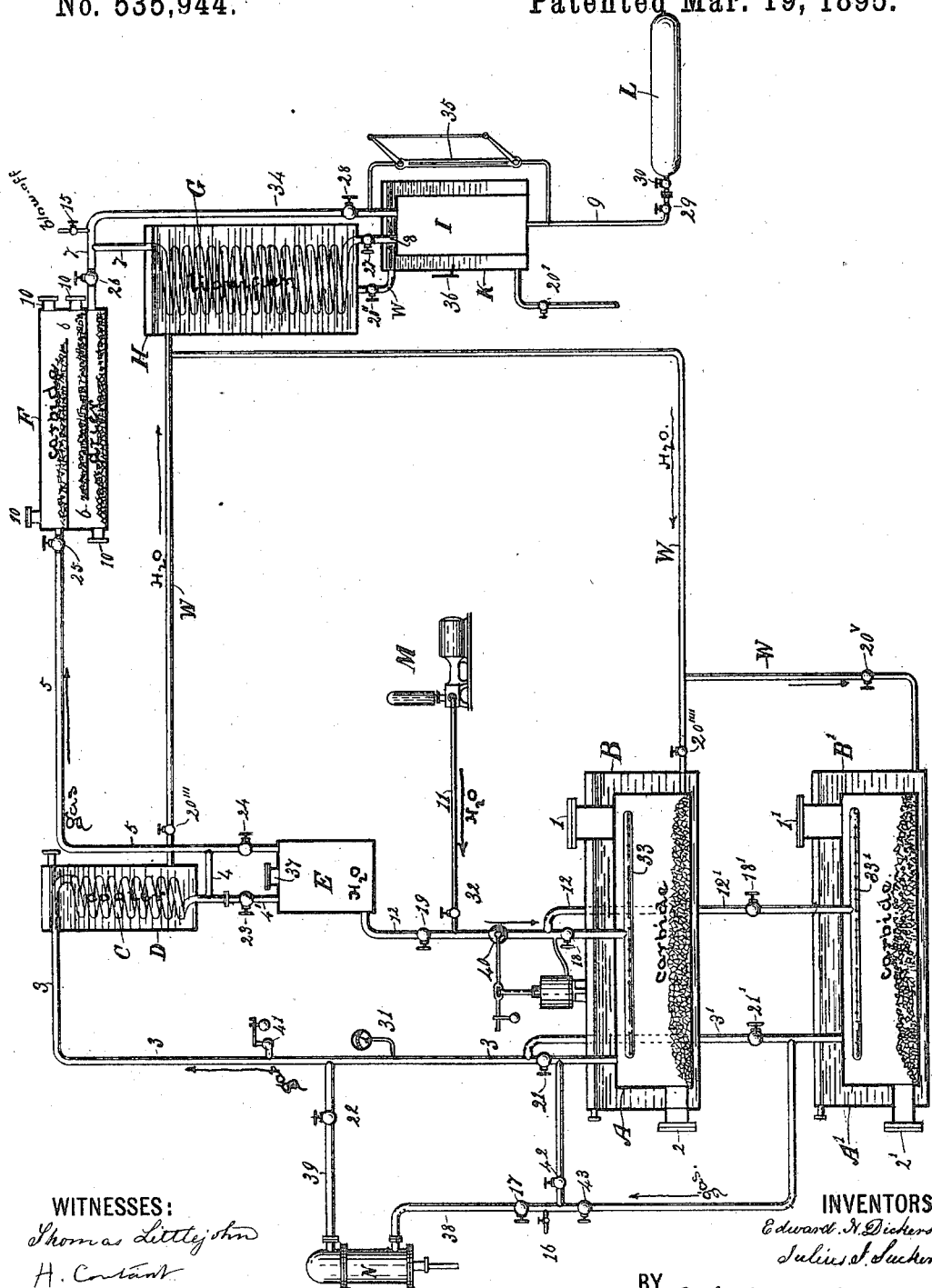
WITNESSES:
Thomas Littlejohn
H. Contant
INVENTORS
Edward N. Dickerson
Julius J. Suckert
BY E N Dickerson
ATTORNEY

UNITED STATES PATENT OFFICE.

EDWARD N. DICKERSON, OF NEW YORK, N. Y., AND JULIUS J. SUCKERT, OF RIDGEWOOD, NEW JERSEY.

PROCESS OF AND APPARATUS FOR PRODUCING AND LIQUEFYING ACETYLENE GAS.

SPECIFICATION forming part of Letters Patent No. 535,944, dated March 19, 1895.

Application filed December 31, 1894. Serial No. 533,372. (No model.)

*To all whom it may concern:*

Be it known that we, EDWARD N. DICKERSON, of the city, county, and State of New York, and JULIUS J. SUCKERT, of Ridgewood, Bergen county, State of New Jersey, have invented a new and useful Improvement in Processes of and Apparatus for Producing and Liquefying Acetylene Gas, of which the following is a full, true, and exact description, reference being had to the accompanying drawing.

Acetylene gas when produced by the decomposition of the carbides of the alkali and alkaline earth metals with water, has reduced the cost of its production to such an extent as to render it commercially applicable to illuminating and other purposes. When an alkali metal carbide is used, the following formula will explain the chemical reaction: $Ka_2C_2 + H_2O = Ka_2O + C_2H_2$ and in the case of alkaline earth metal carbides, $CaC_2 + H_2O = CaO + C_2H_2$. In the former case potassium carbide decomposes one molecule of water forming potassium oxide and acetylene, in the latter calcium carbide and one molecule of water forms calcium oxide and acetylene gas. If an excess of water is present the hyrdates of the oxides of the various metals are formed.

The object of this invention is to produce the liquefaction of acetylene gas at ordinary temperatures by the pressure exerted with this gas is generated by the decomposition of the above-named carbides by bringing them in contact with water, or its vapor, or with compounds containing an easily separated water molecule, such as hydrates.

In the practical application of this process we prefer, for economical reasons, to use the calcium carbide for the generation of the acetylene gas under pressure, and have found that with condensing water at a temperature of 56° Fahrenheit the liquefaction of the gas takes place at about four hundred and eighty-five pounds gage pressure. With condensing water at an average temperature of 68° Fahrenheit, six hundred and ten pounds pressure are required for its liquefaction.

We further find that to insure ready liquefaction and a pure liquefied gas, necessitates the separation of air, non-condensible gases and water from the acetylene gas prior to or during its liquefaction, all of which can be accomplished with the apparatus herein described. It is also advantageous to render the liberation of the gas regular and continuous and to provide proper means for drawing off the liquefied gas into suitable receivers for transportation.

By bringing a properly regulated and continuous stream of water in contact with the carbide, the acetylene is generated and passes from the generator in a continuous current, although it can also be generated in intermittent quantities with the apparatus shown.

Our drawing represents a diagrammatic representation of our apparatus, partly in section, showing the general connection of the parts with each other.

A and A' are wrought iron generators provided with filling openings 1 and 1' and cleaning out openings 2 and 2'. The heat set free by the decomposition of the carbide and water is in great part taken up by the cooling water circulated around the generators A and A' in tanks B and B'.

3 is a gas pipe leading the generated gas and intermingled aqueous vapor to the cooling coil C surrounded by water in tank D. The aqueous vapor condensed in the coil passes as water through the pipe 4' into the water tank E and the gas leaving the cooling coil is conducted through pipes 4 and 5 to the drying tank F, where the remaining moisture is absorbed by exposing the gas to large surfaces of the carbide contained in this tank on suitably constructed shelves 6, 6. From the drier, the gas passes to the condensing coil G, surrounded by the cooling medium contained in tank H. The gas liquefying in this coil flows to the liquefied gas receptacle I also surrounded by a cooling medium in tank K, and is thence drawn through pipe 9, to the transporting tank L.

In carrying out the process the following operations are followed: A known weight of calcium carbide is introduced through the filling openings 1 and 1' into the generators A and A', and is spread over the lower surface of the generators by inserting a rake through the cleaning out openings 2 and 2'. The filling and cleaning out openings are then closed and bolted tight. Into the drier F, calcium carbide is introduced through the openings 10, 10, 10, 10, and spread to a uniform depth on the shelves 6, 6, and on the bottom surface of the drier. The openings are then securely closed. By opening the valves 20', 20'', 20''', 20'''', 20ᵛ, on water pipes W W W, cold water is circulated around those portions of the apparatus requiring a cooling medium. With the exception of the blow-off valves 15 and 16, gas exhausting valve 17, by-pass valves 42 and 43, valve 21', and valves 18 and 18' on water pipes, all valves attached to the apparatus are opened, the transporting tank L being disconnected. The water pump M is now started and water forced through pipes 11 and 12, and valve 19, into water tank E, until a quantity sufficient to decompose the carbide in generator A has been introduced. For every one thousand pounds of calcium carbide in the generator about five hundred and sixty-three pounds of water are required. The water pump M is now stopped, the valve 32 on pipe 11 closed, the valve 18 on pipe 12 gradually opened, and a small quantity of water allowed to enter the generator A through pipe 33, which being provided with numerous small openings sprays the water on the carbide. The acetylene gas thus generated passes through the entire apparatus, forcing the air which it displaces out of pipe 9, attached to the bottom of the liquefied gas receptacle I. As soon as the apparatus is freed from air, the valve 29 on pipe 9 is closed, the valve 18 adjusted, so that a small and uniform quantity of water is sprayed on the carbide in generator A, whereupon the pressure immediately increases in the apparatus, which is indicated by the pressure gage 31. With condensing water at a temperature of 56° Fahrenheit the pressure gradually increases until four hundred and eighty-five pounds are obtained, when liquefaction of the gas commences. The water pressure regulating valve 40, is now adjusted to maintain the gas liquefying pressure uniform, by regulating the quantity of water admitted to the generator, the valve 18 remaining open during this adjustment. The disengaged gas passes from the generator A through the gas pipe 3, to cooling coil C. Here a large portion of the aqueous vapor contained in the gas is condensed and following the course of the coil is discharged into the water tank E. The gas, however, passes through pipes 4 and 5, into the drier F, and circulates slowly in contact with the carbide contained therein, which abstracts any remaining aqueous vapor from the gas, generating at the same time acetylene gas, which intermingles with the gas contained in the drier. The united gases are conducted from the drier through pipe 7, to the condensing coil G, where liquefaction of the gas takes place; the liquefied gas flowing into the liquefied gas receptacle I, through pipe 8. The gas displaced in this receptacle by the liquefied gas entering, escapes through the equalizing pipe 34, and intermingles with the gas entering the condenser. The quantity of liquefied gas produced is ascertained by means of the glass gage 35.

The size of the liquefied gas receptacle having been determined and the temperature of the liquefied gas having been observed by means of thermometer 36, which indicates the temperature of cooling water, it is easy to determine by means of the specific gravity of liquefied gas at the observed temperature the amount of liquefied gas introduced into transporting tank L. The latter is filled by connecting the tank to the flange on the end of pipe 9, then opening valve 30 on transporting tank and valve 29 on liquid pipe. When a sufficient quantity has entered, which is determined by observing the glass gage 35, the valve 30 on transporting tank is closed, then valve 29 on liquid pipe, and the tank is ready to be disconnected. Any air or noncondensable gas accumulating above condenser is allowed to escape to the atmosphere by opening blow-off valve 15.

Valves 27 and 28 on pipes 8 and 34 are closed in case it is desirable to disconnect the liquefied gas receptacle I while filling transporting tank.

Valves 19, 23, 24, on pipes 12, 4', and 5, are closed in case it is desirable to charge water tank E with water independent of pump M. In this case the flange on opening in upper head of tank can be removed and water introduced through opening 37.

When the decomposition of the carbide contained in the generator A is complete, the valves 21 and 18 are closed, valves 42 and 17 opened and the gas conducted through suction pipe 38 to a gas compression pump N, which forces the gas into the drying and liquefying portion of the apparatus through the discharge pipe 39 and valve 22. The gas in generator A having been exhausted, the valves 17 and 42 are closed and the flange removed from the cleaning out opening 2, the refuse caustic lime drawn out of the generator and a new charge of carbide introduced through the filling opening 1. Both openings are then closed, valve 42 and blow-off valve 16 opened, and a small quantity of water sprayed upon the carbide by opening the valve 18. When sufficient gas has been generated to expel the air through blow-off valve 16, the valves 18, 16 and 42 are closed and the generator is ready to be connected with the remainder of the apparatus by opening the valve 21.

In order to render the operation of the apparatus practically continuous, two generators are employed, and while the gas is being produced in generator A and conducted to the drying and liquefying portion of the apparatus, water is introduced into the generator A' in sufficient quantity through the spray pipe 33', by opening the valve 18' on pipe 12', to generate the gas required to expel the air, the valve 21' on pipe 3' remaining closed during this operation, the valves 43 and 16 being open.

After the expulsion of the air, valves 43 and 16 are closed and valve 21' is ready to be opened, as soon as the carbide in generator A is exhausted.

Prior to connecting a freshly charged generator, the water pump M is set in motion and the water tank E refilled with the requisite quantity of water. The water regulating valve 40 adjusts the delivery of water to both generators.

In exhausting the generator A' of gas before recharging, valves 43 and 17 are opened, valves 16, 42, 21' and 18' being closed.

If desirable, instead of intermittently charging the water tank E with water, a known and predetermined quantity can be continuously introduced into the generators by the water pump M through pipes 11, 12, 33 and pipes 12' and 33'.

As soon as the carbide in drier F is sufficiently decomposed, it can be used in the generators and a fresh charge placed in the drier. This is accomplished by closing valves 25 and 26 and stopping the operation of the generators.

The air entering the drier while being charged and subsequently displaced by gas when the valves 25 and 26 are opened, can be readily discharged from the apparatus by opening the blow-off valve 15.

The safety valve 41 is adjusted to prevent the development of any excessive pressure in the apparatus. If such should occur, the excess of gas escapes to the atmosphere.

When in this specification we have spoken of water as a means of decomposing the carbide compounds, we mean to include thereby other equivalents, such as the vapor of water or suitable hydrates. It is also obvious that some portions of the process herein described may be advantageously used without employing the whole process, and that some parts of the apparatus are also useful without the use of the entire combination. For instance, the process of drying the acetylene gas by passing it over a subsequent body of the carbide, thereby simultaneously drying it and increasing the volume of the acetylene gas, we believe to be new, independent of the special process here described of liquefaction, and the combination of the double generators A and A' with suitable connections can also be used, as also various parts of the apparatus without carrying out the entire process.

What we claim as our invention, and desire to secure by Letters Patent, is—

1. The process of generating and liquefying acetylene gas by the decomposition of an alkali metal or alkaline earth metal carbide with water, thereby generating acetylene gas and then liquefying said gas at suitable temperatures under the pressure developed by the generated gas, substantially as described.

2. The process of generating acetylene gas by the decomposition of an alkali metal or alkaline earth metal carbide with water, thereby generating acetylene gas and then drying the generated gas by contact with said carbide, substantially as described.

3. The process of generating and liquefying acetylene gas by the decomposition of an alkali metal or alkaline earth metal carbide with water, thereby generating acetylene gas then drying the generated gas by contact with said carbide and liquefying the same by means of the pressure developed by the generated gas, substantially as described.

4. The process of generating and liquefying acetylene gas from an alkali metal or alkaline earth metal carbide by contact with water, then drying thereby producing acetylene gas and increasing the quantity of said gas by renewed contact with said carbide, and liquefying the combined gases, substantially as described.

5. The process of continuously generating and liquefying acetylene gas from an alkali metal or alkaline earth metal carbide by bringing in continuous contact therewith predetermined quantities of water, thereby producing acetylene gas liquefying said gas continuously, and removing the liquefied gas as necessary, substantially as described.

6. The process of generating and liquefying acetylene gas by the decomposition of an alkali metal or alkaline earth metal carbide with water, thereby producing acetylene gas, and then liquefying said gas, in part by the pressure produced by the combination of the water and the carbide, and in part by pressure applied to said gas by mechanical means, substantially as described.

7. The process of producing liquefying and subsequently utilizing acetylene gas for commercial purposes by the decomposition of an alkali metal or alkaline earth metal carbide with water, thereby producing acetylene gas then drying the gas so produced by renewed contact with said carbide, then liquefying said gas and introducing the same into receptacles which can be separated from the liquefying apparatus and used for transportation purposes, substantially as described.

8. The process of continuously producing and liquefying acetylene gas, which consists in first producing the gas by the decomposition of an alkali metal or alkaline earth metal carbide with water, forcing the air from the apparatus by means of such acetylene, then increasing the pressure to the liquefying pressure under the conditions of the process, continuously removing the moisture from the generated gas into a suitable receptacle, then drying the gas by contact with a drying material, and finally liquefying the gas in an artificially cooled condenser, substantially as described.

9. The process of generating acetylene gas by the decomposition of an alkali metal or alkaline earth metal carbide with water by bringing the same in contact in a suitable generating chamber, in drying, cooling and liquefying the acetylene gas until the charge in the decomposing chamber is practically exhausted, in then exhausting said chamber by an exhaust and compression pump which removes the remaining gas and forces the same into the cooling and liquefying system, which, during said operation, is separated from the generating chamber excepting through said compression pump, substantially as described.

10. The combination of the generator A, means for feeding together in said generator the carbide and water, the cooling coil C, the water reservoir E, the drier F, the condenser G and liquefied gas receptacle I, substantially as described.

11. The combination of the generators A and A', means for feeding together in said generator the carbide and water, cooling coil C, water receiver E, drier F, condenser G, liquefied gas receptacle I, and water pump M, substantially as described.

In testimony whereof we have signed our names to this specification in the presence of two subscribing witnesses.

E. N. DICKERSON.
JULIUS J. SUCKERT.

Witnesses:
H. CONTANT,
W. LAIRD GOLDSBOROUGH.